2,836,630
METHODS OF PREPARATION OF CYCLOHEXADIENES

Alfred Viola, College Park, Md., Herman Fleischacker, Washington, D. C., Gilbert Forrest Woods, Silver Spring, Md., and Nicholas Charles Bolgiano, Pittsburgh, Pa.

No Drawing. Application March 10, 1955
Serial No. 493,576

4 Claims. (Cl. 260—666)

This invention relates to methods of preparation of cyclohexadienes. More particularly, the invention relates to methods of preparation of cyclohexadienes by the cyclization of dienols. The invention further relates to the preparation of cyclohexadienes such as methylcyclohexadiene, dimethylcyclohexadiene, phenylcyclohexadiene, and the like.

The aforementioned cyclohexadienes may readily be converted to the corresponding aromatic equivalents, for example, by conversion of 1,4-dimethylcyclohexadiene to p-xylene as illustrated hereinafter.

The present invention contemplates the catalytic cyclization of alkyl-, polyalkyl-, or aryl-dienols with the loss of the elements of water to substituted cyclohexadienes at elevated temperatures. For convenience the term cyclization will be construed hereinafter to mean dehydrocyclization (cyclization with loss of water).

Alumina, silica, clays and the like are found to be effective catalysts for the aforementioned cyclization.

Cyclization temperatures for optimum yields range from above 300° C. and greatly improved yields are manifested at temperatures of 400° C. and above.

Without intending to limit the scope of the patent thereto, the present invention will be illustrated by the following examples:

EXAMPLE I

*Preparation of phenylcyclohexadiene from 1-phenyl-2,4-hexadien-1-ol*

We observed that the yield of 1-phenyl-1,3,5-hexatriene decreased markedly by increasing the temperature of dehydration over alumina of 1-phenyl-2,4-hexadien-1-ol to 325–350°, and that at this temperature a different substance was obtained. Isolation of the new product by the usual procedure of drying and recrystallization from 30–40° petroleum ether yielded a white crystalline compound melting at 84–86°. Usually seven recrystallizations were necessary in order to obtain a substance whose melting point did not change appreciably on further recrystallization. Only four recrystallizations were necessary when the impure solid was allowed to stand in contact with air, since the soluble impurity (1-phenyl-1,3,5-hexatriene) polymerized and would not dissolve in petroleum ether. Operating in this manner, phenylcyclohexadiene was obtained which was quite stable even when exposed to the air for several weeks.

Analysis.—Calc'd for $C_{12}H_{12}$: C, 92.25; H, 7.75. Found: C, 92.40; H, 7.79.

If, however, the alcohol, 1-phenyl-2,4-hexadien-1-ol, is passed over alumina which is heated to a temperature in excess of that given above (325–350°) the amount of phenylcyclohexadiene isolated increases while the amount of 1-phenyl-1,3,5-hexatriene decreases. Correspondingly, the difficulty of isolation of phenylcyclohexadiene is markedly reduced.

EXAMPLE II

*Preparation of phenylcyclohexadiene from 1-phenyl-1,3-hexadien-5-ol*

1-phenyl-1,3-hexadien-5-ol (15 g.) was passed over alumina heated to 325–350° in the manner described in Example I. Five grams of solid product was obtained which melted at 82–83° after two recrystallizations from 30–40° petroleum ether. A mixed melting point determination of this sample with that obtained above in Example I gave no depression.

EXAMPLE III

*Preparation of 1,4-dimethylcyclohexadiene from 2,5-dimethylhexa-1,3-dien-5-ol*

2,5-dimethylhexa-1,3-dien-5-ol (37 g.) was passed over alumina at a temperature above 350° C., preferably 400–500° C., using reduced pressure and a nitrogen atmosphere. A yellow product (24 g.) was obtained in addition to water. Distillation of this material yielded 1,4-dimethylcyclohexadiene collected from 123–130° C.

Analysis.—Calc'd for $C_8H_{12}$: C, 88.9%; H, 11.1%. Found: C, 88.7%; H, 11.2%. The ultraviolet absorption spectrum is a typical diene curve.

As an example of proof of structure of this substance, the dimethylcyclohexadiene (5.4 g.) was reacted with maleic anhydride (6.8 g.) in benzene (10 ml.). The product thus obtained (6.8 g.) was isolated by distillation 115–118° C./.1 mm. This material solidified and was recrystallized from petroleum ether; M. P. 52–54° C.

Analysis.—Calc'd for $C_{12}H_{14}O_3$: C, 69.88; H, 6.84. Found: C, 69.92, H, 6.94.

This material is not the corresponding adduct from 2,5-dimethylhexatriene which melted at 117–119° C. The Diels-Alder adduct from 1,4-dimethylcyclohexadiene was catalytically hydrogenated to establish the number of ethylenic links remaining. The adduct (1.09 g.) dissolved in petroleum ether absorbed 130 ml. of hydrogen at 760 mm. and 26° C. This is also the value calculated for one ethylenic link.

To establish the existence of the $C_6$ ring in the 1,4-dimethylcyclohexadiene claimed above, the 1,4-dimethylcyclohexadiene was converted to p-xylene; 10 g. of the cyclohexadiene was added dropwise to a flask which contained approximately 1 g. of palladinized charcoal (10%) and which was fitted with a reflux condenser. The flask was heated by immersion in an oil bath, the temperature of which was maintained at 200° during the addition and for a subsequent half hour. The product was isolated by distillation (liquid) and was recrystallized from low boiling petroleum ether. The yield from such treatment was 2.5 g. The substance so obtained gave no depression of melting point with an authenic sample of p-xylene and had an identical ultraviolet absorption spectrum with that of p-xylene.

EXAMPLE IV

*Preparation of 1,3-dimethylcyclohexadiene from 2,4-dimethyl-1,5-hexadien-4-ol*

The dienol, 2,4-dimethyl-1,5-hexadien-4-ol, was passed through a column packed with alumina and heated. If the temperature of the column is approximately 350° C., the product 1,3-dimethylcyclohexadiene, can be isolated in the usual manner. This material boils at 27–28° C./11 mm.; $n_D^{26}$=1.46–1.47, and provides a typical conjugate diene ultraviolet absorption spectrum.

EXAMPLE V

*Preparation of methylcyclohexadienes from 3,5-heptadien-2-ol, or from 2-methyl-1,5-hexadien-3-ol, or from 3-methyl-1,5-hexadien-3-ol*

The passage of any of the above alcohols (which had been obtained by the addition of methyl magnesium chloride to hexadienal, by the addition of allylmagnesium chloride to methacrolein, and the addition of allylmagnesium chloride to methyl vinyl ketone respectively in the usual manner) through a column packed with alumina and heated to a temperature of at least 300° C. led to the loss of a molecule of water and cyclization to methylcyclohexadienes.

From the first dienol the product boiled at 24–29° C./20–25 mm. and the refractive index (D) was 1.45–1.47 at 30° C. Essentially the same results were obtained from the third dienol mentioned above. The product in the instance of 2-methyl-1,5-hexadien-3-ol (the second dienol) boiled at 24–29° C./20–25 mm., $n_D^{26}$=1.44–1.45.

The ultraviolet absorption curves in each case showed typical conjugate diene absorption with small amounts of the triple peak conjugate triene superimposed. The triene impurity was markedly decreased in each case by raising the temperature at which the catalytic reaction was carried out.

Suitable modifications may be made in the foregoing examples without departing from the scope of the invention, as will be apparent to those skilled in the art.

It is intended that the patent shall cover by suitable expression in the appended claims the features of patentable novelty residing in the invention.

We claim:

1. The method of preparation of cyclohexadienes comprising cyclizing, with loss of water, a dienol having at least six carbon atoms at a temperature in excess of 300° C. in the vapor phase in the presence of an inorganic solid catalyst.

2. The method of preparation of substituted cyclohexadienes comprising cyclizing, with loss of water, an alkylhexadienol at a temperature in excess of 300° C. in the vapor phase in the presence of an inorganic solid catalyst.

3. The method of preparation of substituted cyclohexadienes comprising cyclizing, with loss of water, a polyalkylhexadienol at a temperature in excess of 300° C. in the vapor phase in the presence of an inorganic solid catalyst.

4. The method of preparation of substituted cyclohexadienes comprising cyclizing, with loss of water, arylhexadienol at a temperature in excess of 300° C. in the vapor phase in the presence of an inorganic solid catalyst.

References Cited in the file of this patent

UNITED STATES PATENTS

| | | |
|---|---|---|
| 2,406,630 | Pines et al. | Aug. 27, 1946 |
| 2,406,632 | Pines et al. | Aug. 27, 1946 |
| 2,422,435 | Pines et al. | June 17, 1947 |
| 2,737,537 | Taylor et al. | Mar. 6, 1956 |

OTHER REFERENCES

Woods et al.: Jour. Am. Chem. Soc., vol. 70 (1948), pp. 3394–96.

Woods et al.: Jour. Am. Chem. Soc., vol. 77, April 1955, pp. 1800–3.

Fleischacker et al.: Jour. Am. Chem. Soc., vol. 78, July 1956, pp. 3436–3439.

Butz et al.: Journal of Organic Chemistry, vol. 5, pages 171–183 (1939); Jour. Am. Chem. Soc., vol. 64, page 1978 (1942).

Olberg et al.: Jour. Am. Chem. Soc., vol. 66, pp. 1096–99 (1944).